United States Patent [19]

Kump

[11] 3,965,958

[45] June 29, 1976

[54] JOINT ASSEMBLY AND FASTENER THEREFOR

[76] Inventor: Ernest Joseph Kump, 360 Everett Ave., Palo Alto, Calif. 94301

[22] Filed: Oct. 31, 1974

[21] Appl. No.: 519,572

[52] U.S. Cl............................. 52/753 K; 52/586; 24/30.5 P
[51] Int. Cl.² .................... F16B 5/00; F16B 13/08
[58] Field of Search ............. 52/753 K, 586, 753 C, 52/753 D; 24/30.5 P; 74/231 C

[56] References Cited
UNITED STATES PATENTS

| | | | |
|---|---|---|---|
| 2,898,643 | 8/1959 | Bush et al. ..................... | 52/753 K X |
| 3,512,819 | 5/1970 | Morgan et al. ................. | 52/753 K X |
| 3,640,039 | 2/1972 | McKee et al. .................... | 52/586 X |
| 3,685,222 | 8/1972 | Curtess ........................... | 52/586 X |

Primary Examiner—Werner H. Schroeder
Assistant Examiner—Wayne L. Shedd
Attorney, Agent, or Firm—Flehr, Hohbach, Test, Albritton & Herbert

[57] ABSTRACT

An assembly for joining members in juxtaposition at mating edge surfaces on the members. Faces on the mating edge surfaces are provided for abutting contact and a channel extends along the edges behind the faces. An elongate slot is formed through the faces in communication with the channels so that the slots in abutting faces overlie one another. A fastener having an elongate body, which may be flexible about a longitudinal axis, is formed to fit through the elongate slots when the faces on the members are in abutting position. The flexible body allows joining of curviform or convoluted abutting surfaces. Spaced lateral members are attached to the edges of the elongate body and are formed to fit in the channels. The fastener is drawn through the overlying elongate slots and into the channels when the faces of the members are in contact, securing the members in juxtaposition as the lateral members on the fastener contact the surface of the channel adjacent to the elongate slots. Portions on the ends of the lateral members and at the elongate slot edges are relieved to afford a minimum of frictional obstruction during assembly. A cover member is provided for fitting over the mating edges after assembly of the fastener to conceal the joint from view.

11 Claims, 10 Drawing Figures

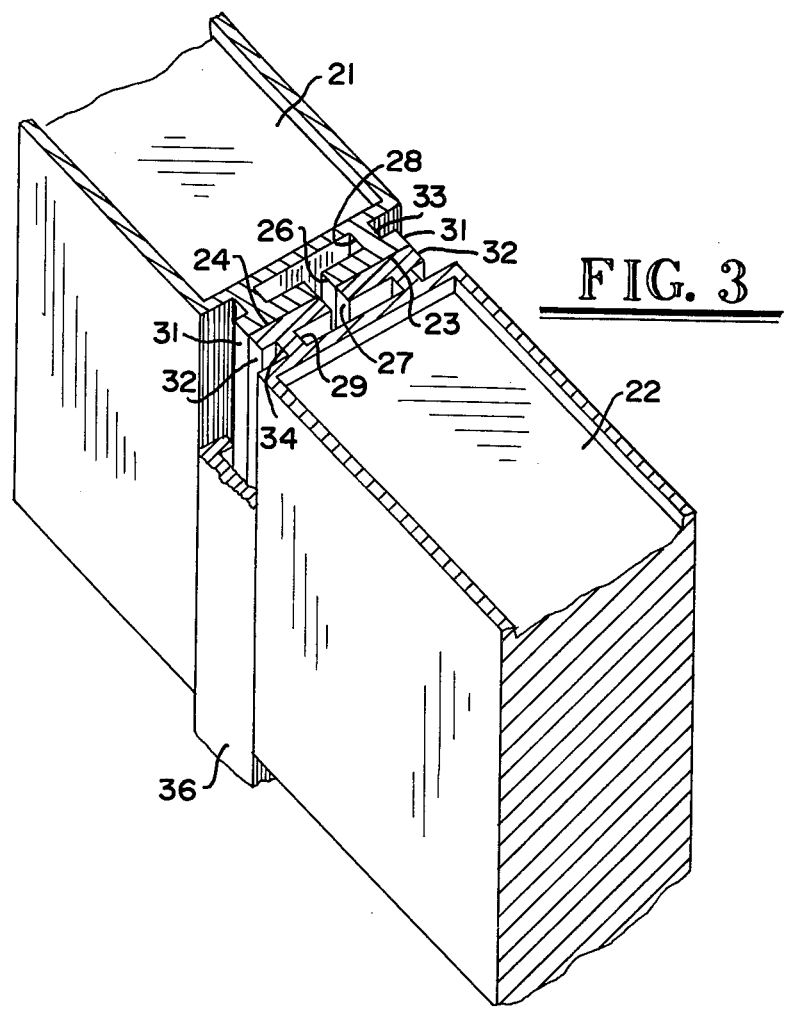
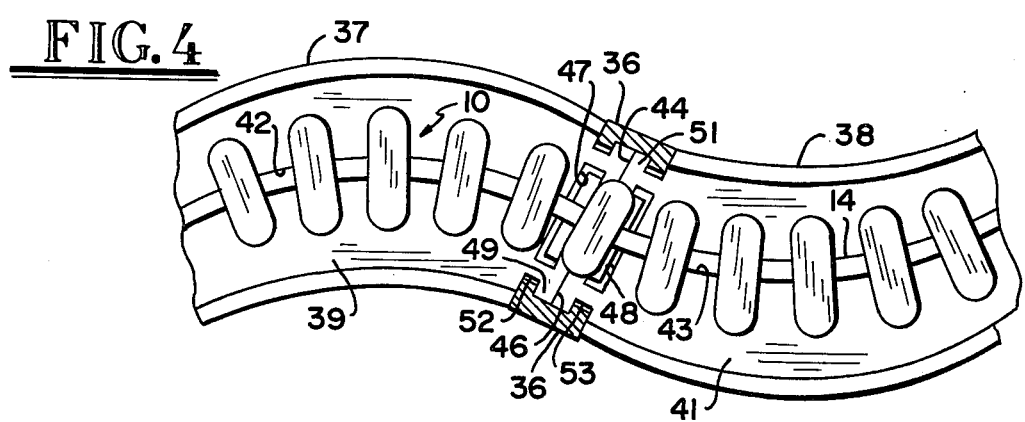

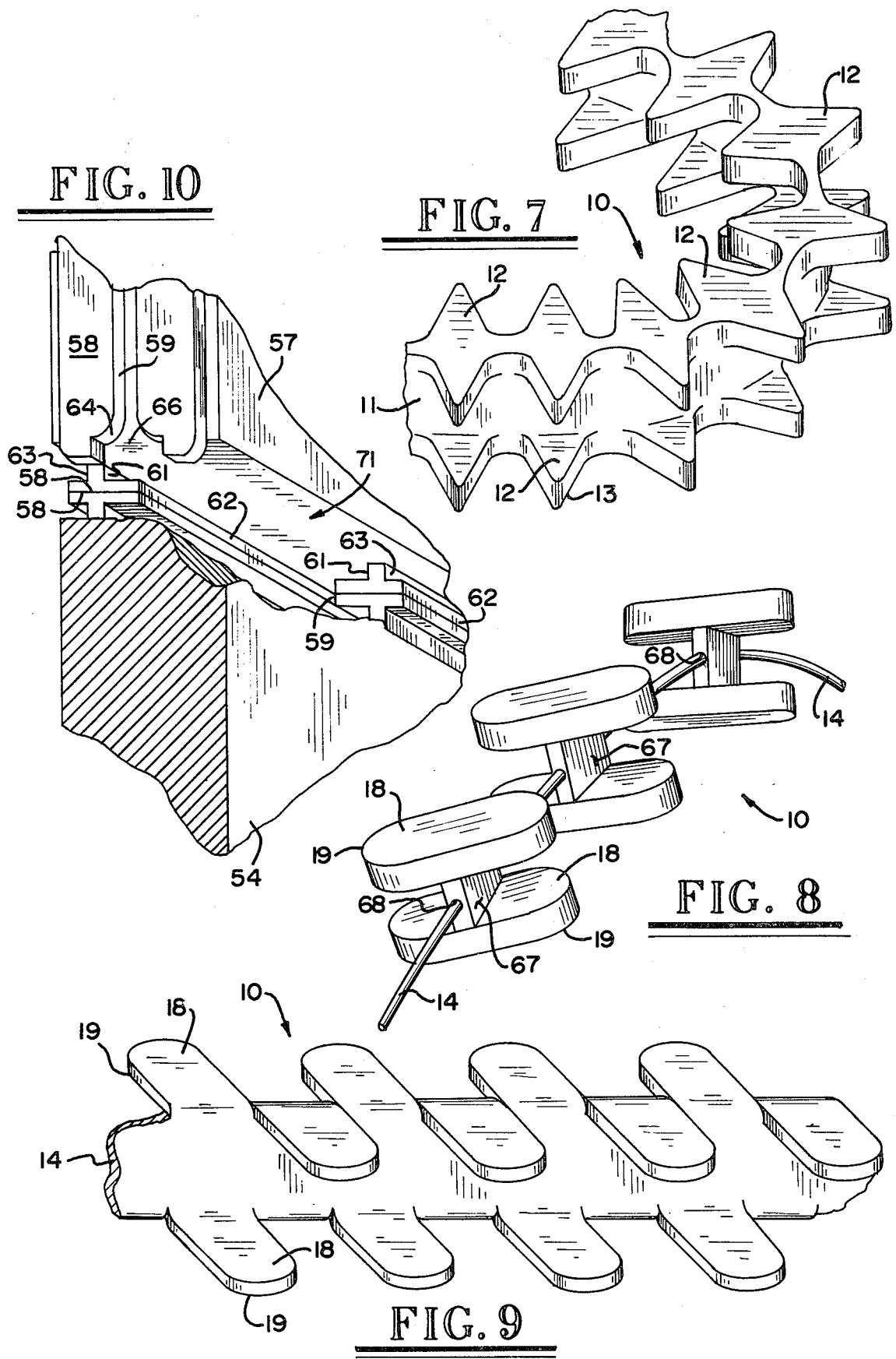

JOINT ASSEMBLY AND FASTENER THEREFOR

BACKGROUND OF THE INVENTION

The disclosed invention relates to a fastener for use in joining adjacent members firmly together, and more particularly to a fastener and joint combination for use in joining together structural walls.

Construction of buildings for living spaces, business facilities, storage spaces and the like have required special tools and skills and considerable innovation at the structural site on the part of those erecting the structure. General structural materials have been provided to the structure site for fine forming, often involving forming to fit on the part of skilled workmen, thereby creating considerable inefficiency in the use of materials, tools and skilled workmanship.

There is therefore a need for a means for joining structural members which requires a minimum of tools and skilled labor at the building site and which allows disassembly of structural members for alterations to structures as readily as it allows the initial erection of the structures themselves.

SUMMARY AND OBJECTS OF THE INVENTION

Structural members have edges for abutting engagement and they are fastened together at the abutting edges by means of a fastener having an elongate body which extends along the edges. A plurality of spaced members are attached to the elongate fastener body for contacting the edges of the members, and means are provided on the adjacent edges for receiving individual ones of the spaced members, thereby securing the members in juxtaposition. The elongate fastener body may be flexible about a longitudinal axis so that the adjacent edges of the members may be curved.

It is an object of the present invention to provide a joint assembly and fastener for quickly securing structural members together at the structure site with a minimum of tools and skilled labor.

It is another object of the present invention to provide a joint assembly and fastener which is concealed from view after assembly.

It is another object of the present invention to provide a joint assembly and fastener which may be easily disassembled.

It is another object of the present invention to provide a joint assembly and fastener providing uniform holding strength along the entire length of the joint.

It is another object of the present invention to provide a joint assembly and fastener which requires no special formation at the structural site.

It is another object of the present invention to provide a joint assembly and fastener which is useful for joining curved mating edges on structural members.

Additional objects and features of the present invention will appear from the following description in which the preferred embodiment has been set forth in detail in conjunction with the accompanying drawings.

BRIEF DESCRIPTION OF THE DRAWINGS

FIG. 3 is an isometric view of a joint assembly formed at abutting faces of joined members.

FIG. 4 is a sectional plan view showing a fastener assembly installed on the edge of a curved member.

FIG. 7 is an isometric view of a sharp bending embodiment of the fastener assembly.

FIG. 8 is an isometric view of a multiple flex axis fastener assembly.

FIG. 9 is an isometric view of a rigid body embodiment of the fastener assembly.

FIG. 10 is an isometric cut-away view showing side entry means for the fastener assembly in the joint assembly.

DESCRIPTION OF THE PREFERRED EMBODIMENTS

Figure 1:
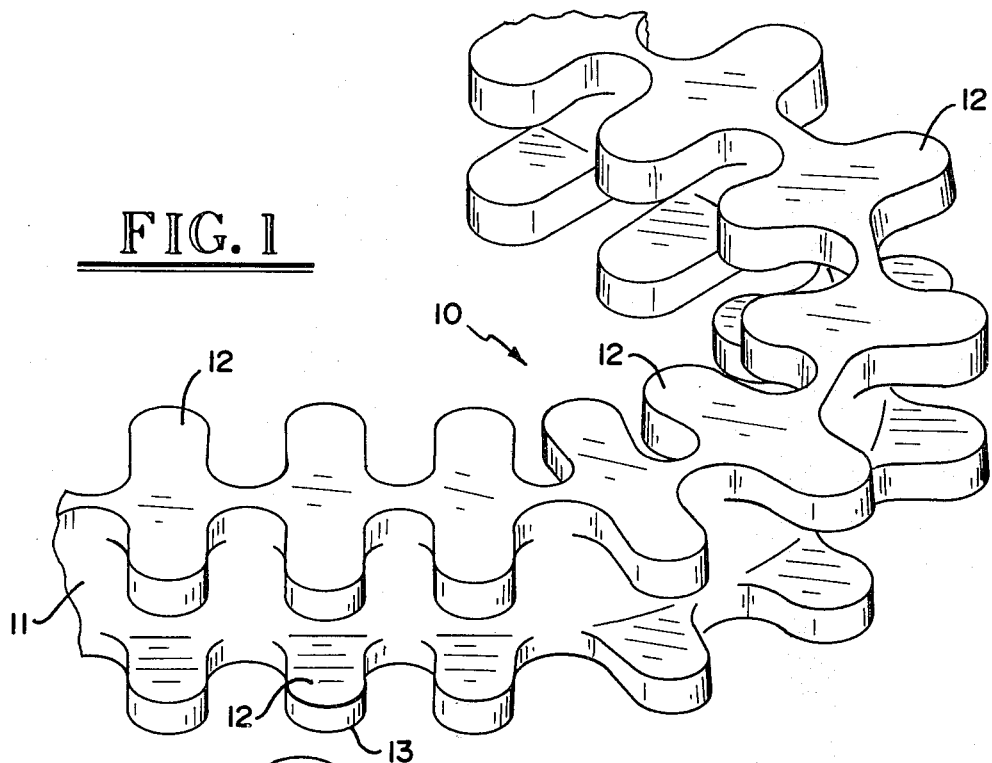
FIG. 1 is an isometric view of one type of fastener assembly.

A fastener assembly 10 is shown in FIG. 1 having an elongate body 11 which is shown in a flexed condition, the body 11 being flexible about an axis through the longitudinal axis thereof. A plurality of spaced members 12 are formed along the length of each edge of the elongate body 11. Spaced members 12 extend laterally from the edge of elongate body 11 and are shown having rounded ends 13.

In the fastener assembly embodiment of FIG. 1 spaced members 12 are formed integrally with elongate body 11, and may be of some material such as a plastic which will allow flexing of body 11 through appreciable angles due to its length while allowing minimal displacement at the rounded ends 13 of spaced members 12 due to their short lateral extension.

Figure 2:
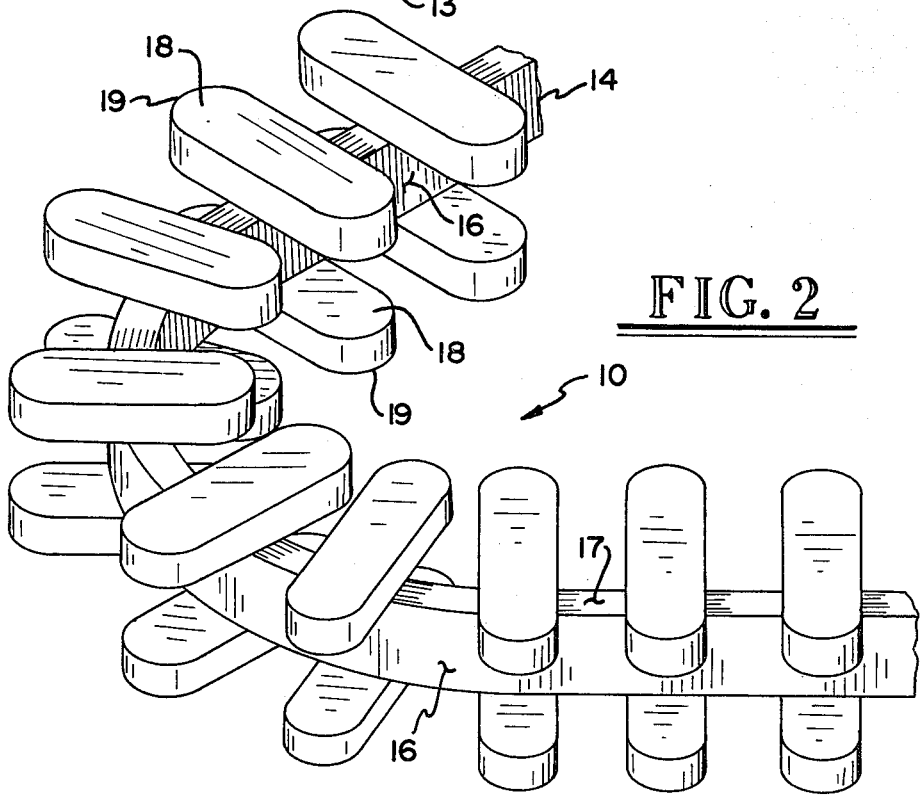
FIG. 2 is an isometric view of another type of fastener assembly.

FIG. 2 shows another embodiment of fastener assembly 10 which includes an elongate body 14 having two sides 16 and narrower opposing edges 17. Elongate body 14 is also flexible about its longitudinal or lengthwise axis as seen in FIG. 2. Spaced laterally extending members 18 are attached to both of the edges 17 on elongate body 14. Lateral members 18 have rounded ends 19 and are spaced sufficiently far apart on body 14 to avoid interference at ends 19 when elongate body 14 is subjected to maximum flexing.

It should be noted that fastener assembly 10 may have an elongate body which is relatively rigid about its longitudinal axis. Such a fastener assembly could then be used for joining members having relatively straight abutting edges. Moreover, the elongate body of fastener assembly 10 may be of a configuration which exhibits flexibility about the lengthwise axis of the body in a direction which is orthogonal to that shown in FIGS. 1 and 2. In this latter case, the fastener may be used to join members having abutting surfaces or edges which are not in a single plane, but form curved surfaces which match for abutting contact. Thus it may be seen that fastener assembly 10 is capable of joining members having abutting edges which are straight and coplanar, curved and coplanar, or which are curviformed or convoluted.

Turning to FIG. 3 a pair of members 21 and 22 are seen having abutting faces 23 and 24 respectively at the edges thereof. An elongate opening 26 is formed in face 23 and an elongate opening 27 is formed in face 24. Channel 28 extends along the edge of member 21 behind face 23 in communication with elongate opening 26. Channel 29 extends along the edge of member 22 behind face 24 in communication with elongate opening 27. Face 23 extends laterally along the edge of member 21 to form flanges 31 at the sides thereof. Face 24 extends laterally on the edge of member 22 to form flanges 32 at the sides thereof. Grooves 33 are thereby formed between the edge of member 21 and flanges 31, and grooves 34 are formed between the edge of member 22 and flanges 32. A joint cover 36 having a generally "U" shaped cross section is formed so that the arms of the "U" extend into the grooves 33 and 34 when faces 23 and 24 are in abutting position. The exterior of joint cover 36 is substantially flush with the side surfaces of members 21 and 22 when it is positioned in grooves 33 and 34, thereby concealing the joint from view.

Elongate openings 26 and 27 overlie one another when faces 23 and 24 are in abutting position. Fastener assembly 10 which may be of the configuration shown in FIG. 1 or FIG. 2 is inserted into the ends of channels 28 and 29 and elongate openings 26 and 27 so that the lateral members 18 on the fastener assembly 10 of FIG. 2, for example, enter channels 28 and 29. Elongate body 14 extends through both elongate openings 26 and 27, and the facing surface of the spaced lateral members 18 contact the surface in channels 28 and 29 which is immediately behind faces 23 and 24 respectively. When fastener assembly 10 has been drawn completely through the length of channels 28 and 29, members 21 and 22 are held with faces 23 and 24 in abutting position.

Turning to FIG. 4 another pair of members 37 and 38 are shown having curved sides. Consequently, face 39 on the edge of member 37 and face 41 on the edge of member 38 appear as coplanar curved strips in plan view. Elongate body 14 is seen to be flexed as it is guided along the curved edge of members 37 and 38 by a pair of elongate openings 42 and 43 in faces 39 and 41, respectively. Elongate openings 42 and 43 in FIG. 4 are similar to elongate openings 26 and 27 shown in FIG. 3.

FIG. 4 also shows faces 44 and 46 similar to faces 23 and 24 in FIG. 3, which are shown in abutting position extending in a plane divergent from the plane containing faces 39 and 41. Channels 47 and 48, similar to channels 28 and 29 in FIG. 3, are shown containing the spaced lateral members 18 on fastener assembly 10 therein for securing faces 44 and 46 together. Joint cover 36 is shown on either side of the joint, enveloping a pair of flanges 49 and 51 similar to flanges 31 and 32 in FIG. 3, and projecting into a pair of grooves 52 and 53 similar to grooves 33 and 34 in FIG. 3.

Figure 5:
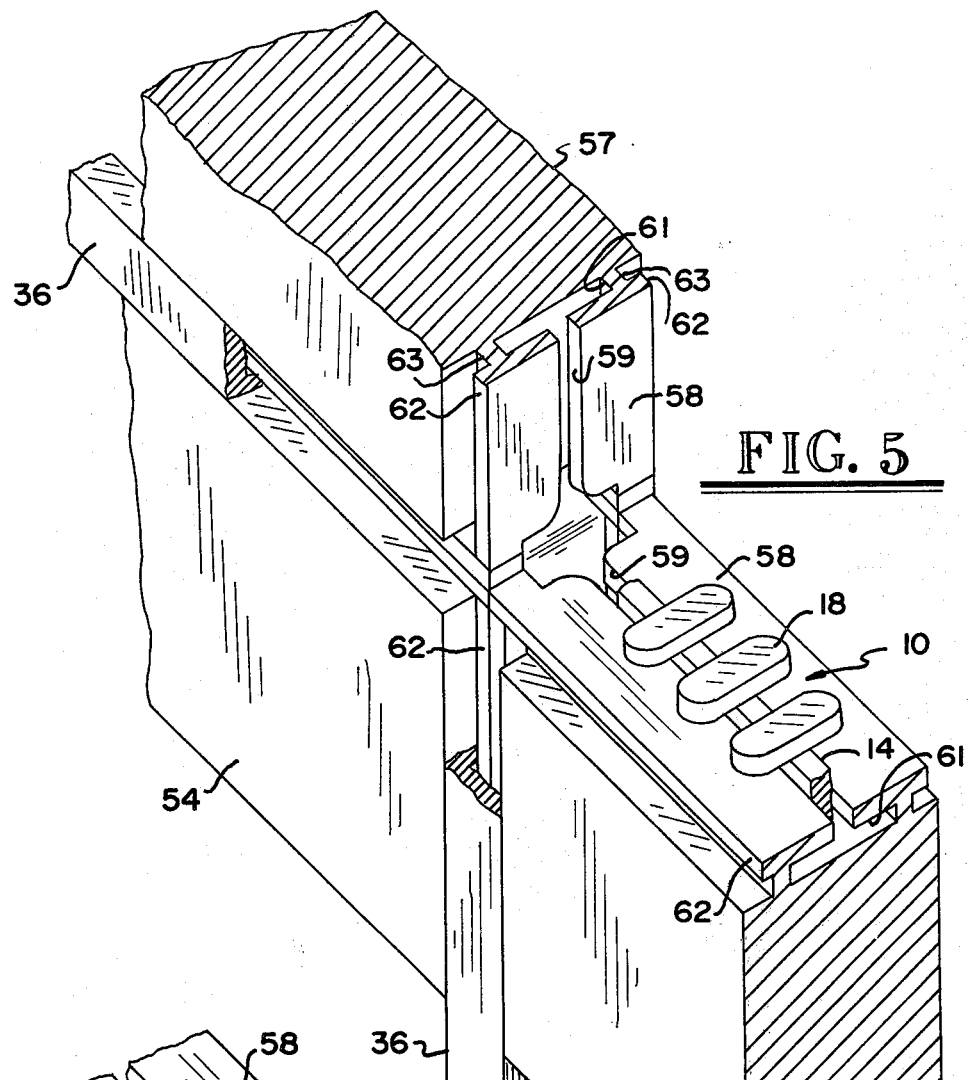
FIG. 5 is an isometric cut-away view showing the various parts of the joint assembly.

FIG. 5 shows how joint assemblies meet at intersecting edges of structural members. Structural members 54, 56, and 57, which may be wall members, have edges which are shown to be substantially perpendicular for purposes of illustration. A fourth wall section which would abut members 57 and 56 is removed to show the inner structure of the fastener and joint assembly. As discussed in the description of FIG. 3 above, each edge of each structural member 54, 56, and 57 has a face 58, and an elongate opening 59 in face 58, a channel 61 extending along the edge of the member behind face 58, flanges 62 formed on both sides of face 58 by a lateral extension of face 58, and grooves 63 between the edges of the structural members 54, 56 and 57 and the flanges 62.

Figure 6:
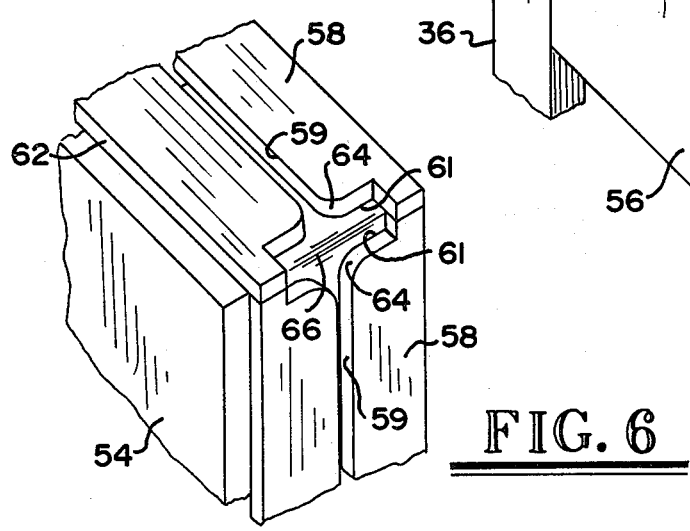
FIG. 6 is a cut-away isometric view showing intersecting edges on a member forming a part of the joint assembly.

FIG. 6 shows the manner in which the ends of elongate opening 59 and channels 61 are maintained unobstructed so that fastener assembly 10 may be entered therein and drawn along the joint assembly until it occupies a sufficient length of the channel 61 to secure the members together. The end of elongate openings 59 have rounded corners 64 to facilitate the passage of elongate body 14 therethrough. The surfaces of channels 61 intersect at a corner 66 which is also rounded to prevent spaced lateral members 18 from catching thereon and impeding progress of fastener assembly 10 as it is drawn through channel 61.

Returning to FIG. 5, the fastener and joint assembly is seen with fastener assembly 10 disposed in elongate opening 59 and channel 61 and with faces 58 on the edges of members 54, 56, and 57 in abutting position. When the fastener assembly 10 has been drawn through each set of channels 61 and elongate openings 59 at abutting faces 58, the members 54, 56, and 57 are secured together by the interaction of spaced lateral members 18 and the walls of channel 61 as described above. Uniform holding strength is thus provided along the entire joint length. Joint covers 36 are placed so that the arms of the "U" shaped cross section extend into grooves 63 enveloping flanges 62, thereby assuming a position so that the outer surface of the joint cover 36 is substantially flush with the surfaces of structural members 54, 56, and 57. The result is a smooth exterior completely covering the joints between the structural members.

The embodiment of the fastener assembly 10 seen in FIG. 7 is similar to the embodiments of FIGS. 1 and 2. It should be noted that a succession of spaced members 12 extend orthogonally to an elongate body 11 at the edges thereof, and narrow toward the outermost ends, describing an approximately triangular shape with rounded tips 13 to facilitate passage through channel 61. When body 11 is flexed about an axis perpendicular to the plane of spaced members 12 it may be seen that the fastener of FIG. 7 may flex more sharply than the embodiments of FIGS. 1 and 2 previously described. The sharp bending characteristic of body 11 in the fastener assembly 10 of FIG. 7 is due to the fact that the triangular shaped spaced members 12 avoid interference at the rounded ends 13 thereof due to the narrowing characteristic from the base of spaced members 12 to their ends 13.

Turning now to FIG. 8 an embodiment of fastener assembly 10 is shown in which the body 14 is formed from a wire or similar elongate member having flexibility about any axis orthogonal to the axis of wire body 14. Spaced members 18 are attached to either end of a member 67 extending between opposing spaced members 18. Member 67 has a hole 68 therethrough in a side-to-side direction for allowing the body member 14 to pass therethrough. It is apparent that the embodiment of FIG. 8 may be used to join structural members having abutting edges which are curviformed or convoluted.

Referring to FIG. 9 the fastener assembly 10 may have an elongate body 14 which is relatively rigid about its longitudinal axis as mentioned heretofore. When relatively straight abutting edges exist on the structural members the fastener of FIG. 9 has considerable utility. The spaced members 18 extend in a substantially orthogonal direction to the plane of elongate body 14 and may be formed by placing spaced transverse cuts in the opposing edges of an elongate sheet of malleable material. Successive members 18 are then bent to extend in alternate directions at the edges of body 14. The ends of members 18 may be seen to be rounded at the tips 19 to prevent snagging as the fastener is drawn through channel 61 as hereinbefore described.

FIG. 10 shows structural sections 57 and 54 on which one side of channel 61 and the abutting faces 58 on one side have been removed for a predetermined length to form a side opening 71 in channel 61. The length is sufficient to allow side entry and feed-in to channel 61 of any of the flexing embodiments of fastener assembly 10 shown in FIGS. 1, 2, 7 or 8. In a structure having a continuous wall it may be seen that one pair of abutting wall sections must have the opening 71 on one side of channel 61 or construction could not be completed. The opening 71 will be covered by joint cover 36 when construction is completed.

It may be seen that disassembly of the combination of structural members seen in FIG. 5 is easily accomplished by first removing joint covers 36. Subsequent removal of fastener assembly 10 is accomplished from the channels 61 in adjacent structural members where separation is desired.

A fastener and joint assembly has been disclosed which requires minimal skill or innovation on the part of assembly personnel at a structural site. It may also be seen that a minimal number of tools is required for assembly. The joint assembly is covered from view after final assembly. Disassembly is easily accomplished without special tools or trained personnel be reversing the process; i.e. removing the joint covers, removing the fastener assembly, and separating the structural members at the edges from which the fastener assemblies have been removed.

I claim:

1. A fastening assembly for members having adjacent edges with abutting faces and channels extending behind the abutting faces with opposed elongate openings through the abutting faces communicating with the channels and extending substantially parallel thereto, comprising
    an elongate body having a thickness adapted to pass through the opposed elongate openings and a height for extending between the channels,
    said elongate body being flexible about the long axis thereof,
    and a plurality of axially spaced members attached to said elongate body extending laterally along both edges thereof and adapted to slidably fit into the channels for contacting the surface thereof adjacent said opposed elongate openings,
    each of said plurality of axially spaced members having a rounded portion at each end thereof, so that the fastening assembly can be drawn through the channels without catching on the sides thereof.

2. A joint assembly securing members in juxtaposition at adjacent edges comprising
    opposing faces along the adjacent edges of the members in abutting contact,
    said opposing faces having channels extending therebehind along the adjacent edges,
    each of said opposing faces having a lengthwise opening therein in communication with said channel, said lengthwise opening in one opposing face overlying said lengthwise opening in the other opposing face,
    and an elongate fastener including a plurality of axially spaced members along both edges thereof positioned in said channels and a body extending along and through said lengthwise openings said body of said elongate fastener being flexible along a longitudinal dimension thereof,
    each adjacent edge having a side opening therethrough in opposing relationship and in communication with said channels, said side opening being configured to accept said elongate fastener whereby said elongate fastener is inserted into said channels and said lengthwise openings from one side thereof, whereby a continuous series of members are secured together.

3. A joint assembly as in claim 2 wherein said opposing faces are curved, whereby said fastener is curved in said channels.

4. A joint assembly as in claim 2 wherein the members have intersecting edges and said channels extend therealong, together with a rounded corner in said channel where the channel surfaces intersect, so that said elongate fastener passes freely into said channels from the ends thereof.

5. A joint assembly as in claim 2 wherein said opposing faces are relieved at the ends of said lengthwise openings so that said elongate fastener passes freely into said channels from the ends thereof.

6. A joint assembly as in claim 2 together with laterally extending flanges on said opposing faces, and elongate covers surrounding said flanges so that the joint is covered from view.

7. A joint assembly in which members are secured in juxtaposition at adjacent edges comprising
    opposing faces along the adjacent edges of the members in abutting contact,
    the adjacent edges having channels extending therealong behind said opposing faces, each channel having an open end
    each of said opposing faces having a lengthwise opening therein in communication with said channels, said opening in one opposing face overlying said opening in the other opposing face,
    and an elongate fastener, a flexible body said elongate fastener extending along, through and substantially filling said lengthwise openings, and a plurality of axially spaced laterally extending members attached along both edges of said flexible body contacting the surfaces of said channels adjacent said lengthwise openings.

8. A joint assembly as in claim 7 wherein said laterally extending members have rounded ends, thereby avoiding jamming against the sides of said channels during assembly as said elongate fastener is drawn therethrough.

9. A fastener for joining members having edges in abutting engagement with opposed elongate flanged channels engageable with each other, comprising
    an elongate body,
    said elongate body being flexible about a longitudinal axis and having a height for extending between the flanged channels,
    and a plurality of axially spaced engaging members formed along each edge of said elongate body for engaging the flanged channels, thereby securing the members in juxtaposition, said axial spaces between said engaging members being sufficient to prevent contact therebetween as said elongate body flexes,
    whereby the cross section so that jamming of the fastening assembly in the channels is avoided.

10. A joint assembly in which members are secured in juxtaposition at adjacent edges thereof, comprising an elongate fastener body extending along the adjacent edges,
said elongate fastener body being flexible about the longitudinal axis thereof,
faces on the adjacent edges in abutting contact,
said faces having elongate openings therein overlying one another and channels communicating with said elongate openings and running behind said faces, each channel having at least one open end
a plurality of axially spaced members attached along both edges of said elongate fastener body positioned within said channels and extending substantially over the height of said channels,
whereby curved abutting members are secured together by positioning said plurality of axially spaced members within said channels and jamming of said spaced members in said channels is prevented.

11. A joint assembly as in claim 10 wherein said faces each have an entry opening at the side thereof overlying one another in communication with said channels, whereby said elongate fastener body and said plurality of axially spaced members introduced into said channels from the sides thereof, so that a continuous assembly of the members may be constructed.

* * * * *